US007021288B2

(12) United States Patent
Asano et al.

(10) Patent No.: US 7,021,288 B2
(45) Date of Patent: Apr. 4, 2006

(54) INJECTION CONTROL APPARATUS FOR AN ENGINE

(75) Inventors: Masahiro Asano, Kariya (JP); Eiji Takemoto, Obu (JP); Akira Umehara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/967,241

(22) Filed: Oct. 19, 2004

(65) Prior Publication Data

US 2005/0092298 A1 May 5, 2005

(30) Foreign Application Priority Data

Oct. 31, 2003 (JP) ............................ 2003-372281

(51) Int. Cl.
*F02D 41/04* (2006.01)
*F02D 41/14* (2006.01)
*F02D 41/40* (2006.01)

(52) U.S. Cl. ...................... 123/435; 123/436; 123/674

(58) Field of Classification Search ................ 123/435, 123/436, 568.21, 674, 687; 701/104, 109, 701/110, 111

See application file for complete search history.

(56) References Cited

U.S. PATENT DOCUMENTS 5,385,129 A * 1/1995 Eyberg ...................... 123/436
6,694,945 B1 * 2/2004 Kawaguchi et al. ........ 123/436
6,755,176 B1 * 6/2004 Takeuchi et al. ............ 123/436
6,907,861 B1 * 6/2005 Asano et al. ............... 123/436

FOREIGN PATENT DOCUMENTS

EP 001245809 A2 * 10/2002

* cited by examiner

*Primary Examiner*—Tony M. Argenbright
(74) *Attorney, Agent, or Firm*—Nixon & Vanderhye P.C.

(57) ABSTRACT

An injection quantity control apparatus for accurately performing an injection quantity learning process in a diesel engine creates an environment for obtaining a characteristic value in a one-to-one relationship with an actual injection quantity. A controller performs a one-shot injection operation for a cylinder of an engine while the environment is established. An injection command quantity is corrected based on an engine speed variation caused by the one-shot injection. After establishment of the condition and before the injection, the opening of a valve is controlled to be smaller than a reference and an opening of each of a diesel throttle and variable turbocharger is controlled to be larger than a reference. A composition of an air flowing into a combustion chamber is stabilized to ensure that the characteristic value detected after the one-shot injection is in a one-to-one relationship with the actual injection quantity.

18 Claims, 7 Drawing Sheets

INJECTION CONTROL APPARATUS FOR AN ENGINE

CROSS REFERENCE TO RELATED APPLICATIONS

This application is based upon and claims the benefit of priority of Japanese Patent Application No. 2003-372281, filed on Oct. 31, 2003, the contents of which are incorporated herein by reference.

FIELD OF THE INVENTION

The present invention relates to an injection quantity control apparatus for performing an injection quantity learning process related to a diesel engine.

BACKGROUND OF THE INVENTION

A method for suppressing combustion noise and NOx emissions from a diesel engine by performing a pilot injection operation is known. The pilot injection operation includes injecting a small amount of fuel into a combustion chamber prior to a main injection operation. Since pilot injection operations typically include a small quantity of fuel, which is referred to as a command quantity, it is desired to improve the accuracy of the quantity injected to obtain sufficient effects, namely, reduction of combustion noise and NOx emission. One way to improve accuracy is to implement an injection quantity learning process. The process includes determining a difference between an actual quantity of fuel injected (hereinafter referred to as "actual injection quantity") and the command quantity. The process then compensates for the detected difference.

Thus, the present application provides a fuel injection controller for performing a highly accurate injection quantity learning process, as disclosed in unpublished Japanese Patent Application No. 2003-185633, which corresponds to U.S. Pat. No. 6,907,861. The fuel injection controller is adapted such that during an idle state while no fuel is injected and the engine is running a one-shot injection for learning is performed for a particular one of a plurality of cylinders of a diesel engine. An idle state is present when the command quantity of fuel for the injectors is not greater than zero, for example, during a gear change and deceleration of the vehicle. The controller determines the actual injection quantity based on a variation in engine speed caused by the one-shot injection. The controller then corrects the command quantity depending upon a difference between the actual injection quantity and the command value for the performed one-shot injection.

To increase the accuracy of the correction of the command value in the above-described injection quantity learning process, it should be arranged such that a characteristic (e.g., the variation in engine speed, air-fuel ratio, or pressure in the cylinder) representative of an effect of the one-shot injection operation can identify different values of the actual injection quantity. More specifically, a value of the characteristic should correspond to a particular value of the actual injection quantity in a one-to-one relationship. Therefore, different values of the characteristic should never be obtained where the one-shot injection is performed a plurality of times under the same conditions. Conversely, a same value of the characteristic should never be obtained where the one-shot injection is performed a plurality of times under different conditions.

Where the characteristic is engine speed variation, the actual injection quantity and the characteristic do not have a one-to-one relationship and are roughly classified into the following two categories:

a) Combustion varies although the injection quantity is constant.

The value of the characteristic (hereinafter referred to as the "characteristic value") varies depending upon whether or not a sufficient amount of oxygen for the complete combustion of the injected fuel is provided. In addition, the combustion is slowed when the exhaust gas is recirculated by an EGR system, thereby varying the detected characteristic value.

b) An engine load varies during the detection of the characteristic value.

A pumping loss or energy loss in compressing the intake air, and other changes occur when the intake airflow is varied, thereby affecting the characteristic value.

Thus, to have the actual injection quantity and the characteristic value in a one-to-one relationship, the airflow into the combustion chamber should be controlled. The unpublished Japanese patent document described above, however, does not teach details of such a control of airflow and, thus, there may be a case when the detected characteristic value and the actual injection quantity do not correspond in a one-to-one relationship.

The present invention has been developed in view of the above-described situations to provide an injection quantity control apparatus for a diesel engine that establishes a suitable learning environment when injection quantity learning is to be performed. This ensures that the characteristic value is in a one-to-one relationship with the actual injection quantity, thereby enabling a highly accurate injection quantity learning process to be performed.

SUMMARY OF THE INVENTION

The present invention provides an injection quantity control apparatus for performing an injection quantity learning process for a diesel engine having an EGR system. The EGR system includes an EGR valve and recirculates a portion of an exhaust gas back into an air intake passage. The injection quantity learning process includes a one-shot injection operation. The one-shot injection operation includes injecting a command quantity of fuel into a combustion chamber of a particular one of a plurality of cylinders of the diesel engine while a predetermined learning condition is present. The command quantity is corrected based on an amount of change of a state of the engine caused by the one-shot injection. Furthermore, a degree of opening of the EGR valve is controlled to be smaller than a predetermined reference after the predetermined learning condition is established and before the one-shot injection is performed.

In the injection quantity control apparatus described above, the one-shot injection operation is not performed at least until the degree of opening of the EGR valve is controlled to be smaller than the predetermined reference. Thus, an amount of the exhaust gas recirculated back into the air intake passage (i.e., an EGR gas) during the injection quantity learning process can be reduced. This stabilizes the composition of the intake air introduced into the combustion chamber of the diesel engine. Consequently, the influence of the EGR gas on the amount of change of the state of the engine caused by the one-shot injection operation can be reduced. This enables the detected value of a characteristic, namely, the amount of change of the state of the diesel engine, to correspond to the actual injection quantity in a one-to-one relationship.

In another aspect of the present invention, there is provided an injection quantity control apparatus for performing an injection quantity learning process for a diesel engine having a diesel throttle in an air intake passage. The injection quantity learning process includes a one-shot injection operation. The one-shot injection operation includes injecting a command quantity of fuel into a combustion chamber of a particular one of a plurality of cylinders of the diesel engine while a predetermined learning condition is present. The command quantity is corrected based on an amount of change of a state of the engine caused by the one-shot injection operation. Furthermore, a degree of opening of the diesel throttle is controlled to be larger than a predetermined reference after the predetermined learning condition is established and before the one-shot injection operation is performed.

In the injection quantity control apparatus described above, the one-shot injection operation is not performed at least until the degree of opening of the diesel throttle is controlled to be larger than the predetermined reference. Thus, a sufficient amount of air for the complete combustion of the fuel injected by the one-shot injection operation can be ensured. Furthermore, the pumping loss can be reduced during the injection quantity learning process. Consequently, the detected value of a characteristic, namely, the amount of change of the state of the diesel engine, is able to correspond to the actual injection quantity in a one-to-one relationship.

In another aspect of the present invention, there is provided an injection quantity control apparatus which implements the injection quantity learning process for a diesel engine having a variable turbocharger which compresses intake air by utilizing energy of an exhaust gas. The injection quantity learning process includes a one-shot injection operation. The one-shot injection operation includes injecting a command quantity of fuel into a combustion chamber of a particular one of a plurality of cylinders of the diesel engine while a predetermined learning condition is present. The command quantity is corrected based on an amount of change of a state of the engine caused by the one-shot injection operation. Furthermore, a degree of opening of the variable turbocharger is controlled to be larger than a predetermined reference to lower a boost pressure after the predetermined learning condition is established and before the one-shot injection operation is performed.

In the injection quantity control apparatus described above, the one-shot injection operation is not performed at least until the degree of opening of the variable turbocharger is controlled to be larger than the predetermined reference. This lowers the boost pressure compared to when the degree of opening is coincident with the predetermined reference. Therefore, a pumping loss associated with the emission of an exhaust gas from the cylinder is reduced during the injection quantity learning process. This enables the detected value of a characteristic, namely, the amount of change of the state of the diesel engine, to correspond to the actual injection quantity in a one-to-one relationship.

In another aspect of the present invention, there is provided an injection quantity control apparatus which implements injection quantity learning process for a diesel engine having at least one of an EGR system which includes an EGR valve and recirculates a portion of an exhaust gas back into an air intake passage, a diesel throttle for regulating intake air flow, and a variable turbocharger which compresses intake air by utilizing energy of the exhaust gas. The injection quantity learning process includes a one-shot injection operation. The one-shot injection operation injects a command quantity of fuel into a combustion chamber for a particular one of a plurality of cylinders of the diesel engine while a predetermined learning condition is established. The process corrects the command value based on an amount of change of a state related to the engine caused by the one-shot injection operation. At least one of the following operations is performed after the predetermined learning condition is established and before the one-shot injection operation is performed: a degree of opening of the EGR valve is controlled to be smaller than a predetermined reference; a degree of opening of the diesel throttle is controlled to be larger than a predetermined reference; and a degree of opening of the variable turbocharger is controlled to be larger than a predetermined reference to lower a boost pressure.

In the injection quantity control apparatus described above, the one-shot injection operation is not performed at least until one of the following operations is performed: the degree of opening of the EGR valve is controlled to be smaller than the predetermined reference; the degree of opening of the diesel throttle is controlled to be larger than the predetermined reference; and the degree of opening of the variable turbocharger is controlled to be larger than the predetermined reference. Thus, at least one of the following effects can be obtained: the influence of the EGR gas on the amount of change of the state related to the engine caused by the one-shot injection operation can be reduced; a sufficient amount of air for the complete combustion of the fuel injected by the one-shot injection operation can be ensured while an influence of a pumping loss is reduced; and the pumping loss associated with the emission of the exhaust gas from the cylinder is reduced. Consequently, the detected value of a characteristic, namely, the amount of change of the state of the diesel engine, can correspond to the actual injection quantity in a one-to-one relationship.

In yet another aspect of the present invention, the one-shot injection operation is performed after the EGR valve is fully closed. This cuts off the flow of the EGR gas back into the air intake passage, thereby completely eliminating the influence of the EGR gas on the amount of change of the state caused by the one-shot injection operation. Consequently, a highly accurate injection quantity learning process can be performed.

In yet another aspect of the present invention, the one-shot injection operation is performed after the diesel throttle is fully opened. This ensures a sufficient amount of air for the complete combustion of the fuel, while reducing the influence of the pumping loss. Consequently, a highly accurate injection quantity learning process can be performed.

In yet a further aspect of the present invention, the one-shot injection operation is performed after the variable turbocharger is fully opened so as to lower the boost. This reduces the pumping loss associated with the emission of the exhaust gas from the cylinder. Consequently, a highly accurate injection quantity learning process can be performed.

In yet a further aspect of the present invention, a difference between an actual value of the amount of change of the state caused by the one-shot injection operation and a nominal value of the amount of change of the state for the command quantity caused by the one-shot injection operation is obtained. This is accomplished by graphing a relationship between command quantities and respective amounts of change of the state and storing the graph. Furthermore, a difference is calculated between the actual and nominal values of the amount of change of the state. The actual value is based on the amount of change of the state caused by the one-shot injection operation and the nominal value is known from the aforesaid graph. The command quantity for the one-shot injection operation is corrected according to the difference.

In yet a further aspect of the present invention, the actual value of the injection quantity in the one-shot injection operation is calculated based on the amount of change of the state caused by the one-shot injection operation. The command quantity for the one-shot injection operation is corrected according to a difference between the calculated actual value and the command quantity with respect to the performed one-shot injection operation.

In yet still a further aspect of the present invention, a first injection pulse width corresponding to the actual value of the injection quantity in the one-shot injection operation is compared with a second injection pulse width corresponding to the command quantity. The command value is corrected according to a difference between the first and second pulse widths.

In yet still a further aspect of the present invention, the predetermined learning condition includes at least a non-injecting state, wherein the command quantity supplied to the injector is not larger than zero. By this arrangement, the amount of change of the state caused by the one-shot injection operation can be accurately detected, thereby enabling a highly accurate injection quantity learning process.

The non-injecting state, wherein the command quantity supplied to the injector is not larger than zero, may be a state where a fuel supply to the combustion chamber is cut off, namely, during a gear change and deceleration of the vehicle, for instance.

In yet still a further aspect of the present invention, the amount of change of the state of the engine caused by the one-shot injection operation may be a variation in engine speed, an air-fuel ratio, or a pressure in the cylinder.

DETAILED DESCRIPTION OF THE PREFERRED EMBODIMENTS

Figure 1:
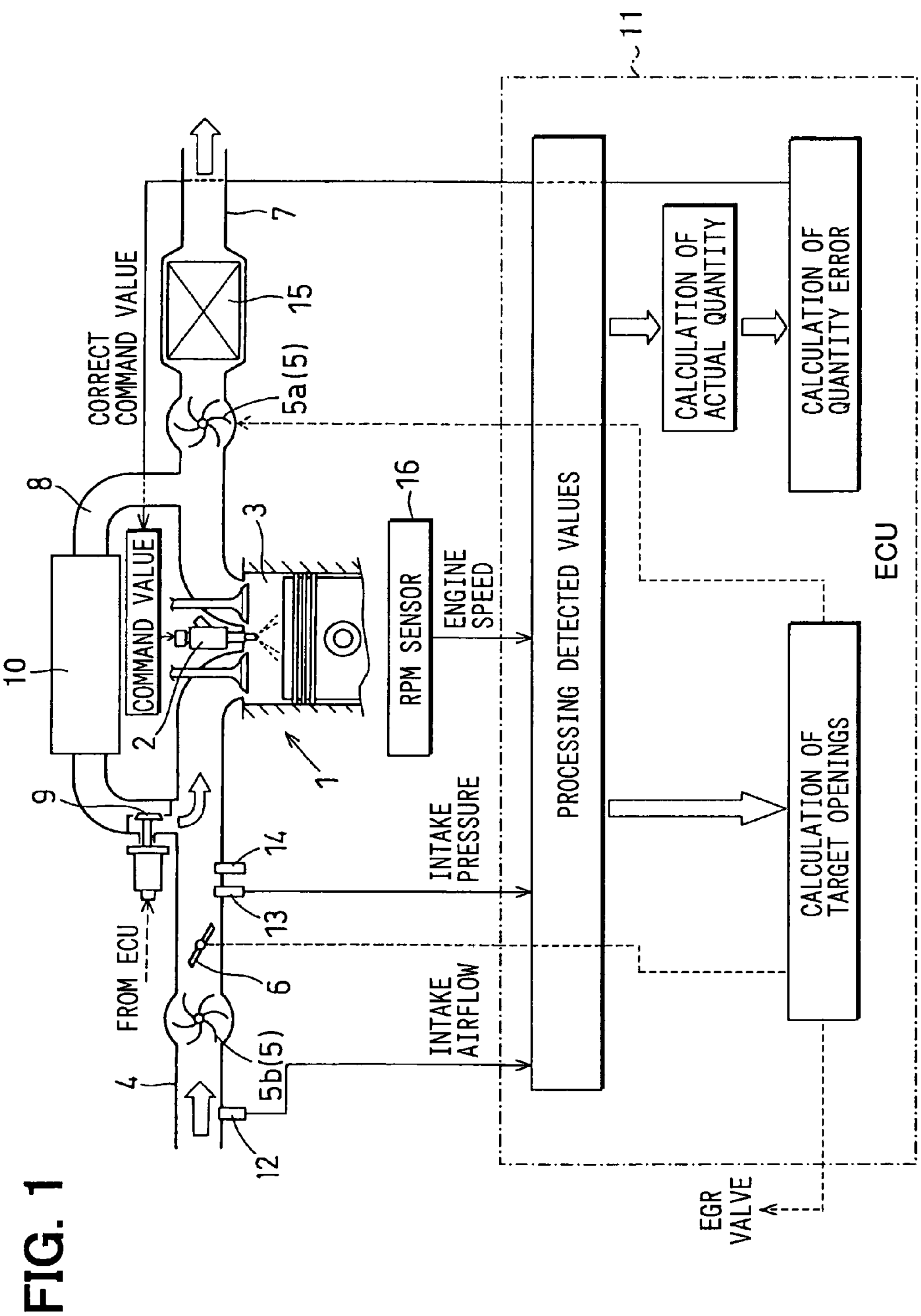
FIG. 1 is a schematic diagram of a control system for a diesel engine in accordance with the principles of the present invention.

FIG. 1 is a schematic diagram of a control system for a diesel engine 1 according to the principles of the present invention. The diesel engine 1 employs an accumulator injection system, wherein high-pressure fuel is accumulated in a common rail (not shown) and injected into a plurality of combustion chambers 3 associated with a plurality of cylinders.

As shown in FIG. 1, an EGR system for recirculating a part of an exhaust gas back into an air intake passage 4, a variable turbocharger 5 whose nozzle opening or restriction is variable, and a diesel throttle 6 capable of regulating the intake air flow are provided in an air flow system of the engine 1.

The EGR system is constructed such that an EGR valve 9 is provided in an EGR passage 8 for communication between an exhaust passage 7 and the air intake passage 4. This regulates an amount of the exhaust gas, or the EGR amount, recirculated back into the air intake passage 4 through the EGR passage 8 in accordance with the opening of the EGR valve 9.

In the EGR passage 8, there is also provided a cooling system 10, which cools the exhaust gas (EGR gas) flowing through the EGR passage 8. The cooling system 10 may include, for instance, a heat exchanger using cooling water. By means of this cooling system 10, the EGR gas expanded by heat is compressed into a dense state. The dense EGR gas is then recirculated back into the intake air passage 4.

The variable turbocharger 5 includes an exhaust gas turbine 5*a* disposed in the exhaust passage 7 and a compressor 5*b* disposed in the intake air passage 4. With the exhaust gas turbine 5*a* being driven by energy of the exhaust gas, the compressor 5*b*, which is coaxially connected to the exhaust gas turbine 5*a*, is driven to compress the intake air supplied to the engine 1.

The diesel throttle 6 is located between a junction point, where the EGR passage 8 is connected to the intake air passage 4, and the compressor 5*b*. The diesel throttle 6 regulates the intake airflow into the engine 1 depending upon its valve opening or position.

A vacuum actuator or an electric motor drives each the diesel throttle 6 and EGR valve 9. An ECU 11 regulates the positions of the diesel throttle 6 and EGR valve 9. These components comprise an injection quantity control apparatus.

An air flow meter 12 is disposed in the intake air passage 4. The air flow meter 12 is for measuring the intake air flow provided upstream of the compressor 5*b*. An intake pressure sensor 13 and an intake temperature sensor 14 for detecting the pressure and the temperature of the intake air, respectively, are provided downstream of the compressor 5*b*.

In the exhaust passage 7, a catalyst unit 15 for purifying the exhaust gas is provided downstream of the exhaust gas turbine 5*a*.

The ECU 11 performs an injection quantity learning process, as will be described below. The process enables the ECU 11 to enhance the accuracy in an injection of a slight quantity of fuel during a pilot injection operation prior to a main injection operation.

The injection quantity learning process detects a difference between a command quantity for the pilot injection and a quantity actually injected from an injector 2 (hereinafter referred to as "actual injection quantity") in accordance with the command quantity. Furthermore, the command quantity is corrected depending upon the difference.

Figure 2:
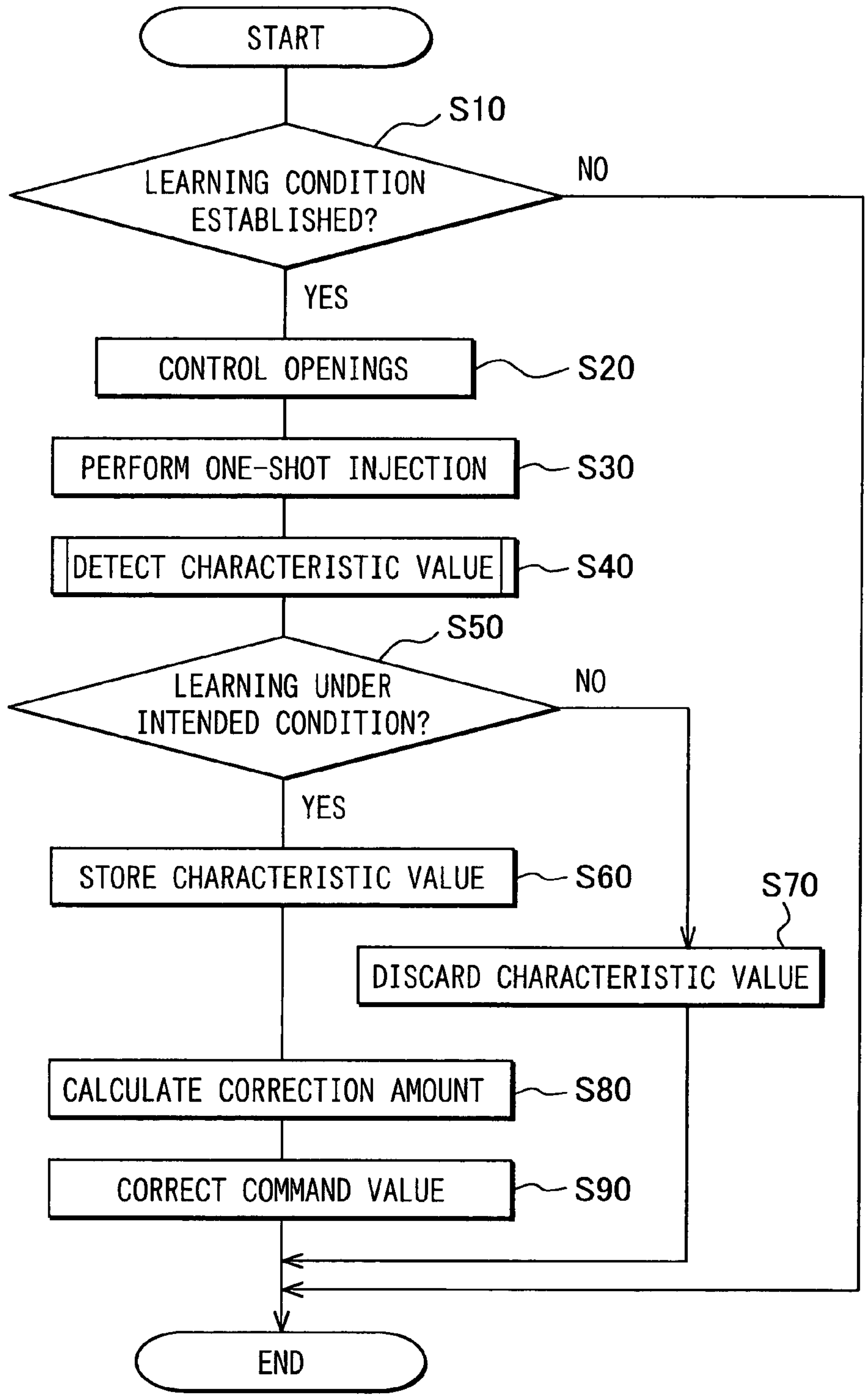
FIG. 2 is a flowchart of an injection quantity learning process executed by the control system of FIG. 1.

With reference to FIG. 2, the injection quantity learning process is described.

Step 10: The ECU 11 determines whether or not a predetermined condition for implementing the injection quantity learning process is established. For example, a predetermined condition is established during a non-injecting state or when a predetermined common rail pressure is maintained. A non-injecting state may be where the command quantity supplied to the injector 2 is not larger than zero (e.g., during a gear change and deceleration of the vehicle). When an affirmative determination (YES) is obtained in Step 10, the ECU 11 proceeds to Step 20. On the other hand, when a negative determination (NO) is obtained in Step 10, the ECU 11 terminates the process.

Step 20: The ECU 11 controls a position of each of the EGR valve 9, diesel throttle 6, and variable turbocharger 5. The content of the control is described in more detail below.

Figure 3:
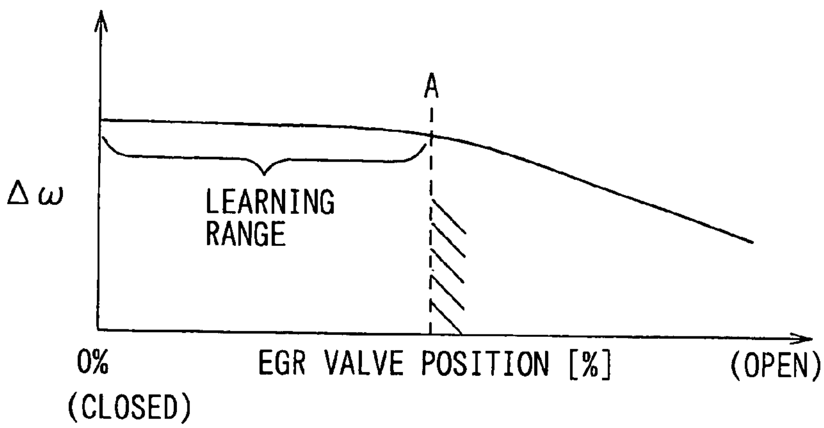
FIG. 3 is a graph illustrating a relationship between an EGR valve position and an engine characteristic.

If the EGR valve 9 is open during the injection quantity learning process, EGR gas that contains an inert gas is introduced into the cylinder. This affects the state of combustion. Consequently, as an EGR rate increases with an increase in the opening of the EGR valve, the detected value of a characteristic, e.g., variation in engine speed, tends to decrease, as shown in FIG. 3.

Hence, during the injection quantity learning process, the ECU 11 positions the EGR valve 9 slightly open. This helps eliminate or reduce the influence of the EGR gas. In this regard, however, since the injection quantity learning process is performed while the non-injecting state is established, a portion of the inert gas in the EGR gas is so low that the influence of the EGR gas is not necessarily seen. Therefore, although it is ideal that the EGR valve 9 be fully closed, this is not essential. It suffices that the position of the EGR valve 9 is controlled to be open, but only open to a degree that is less than a predetermined reference A opening, as shown in FIG. 3. The predetermined reference A may be set depending upon an oxygen concentration of the EGR gas and the EGR rate.

Figure 4:
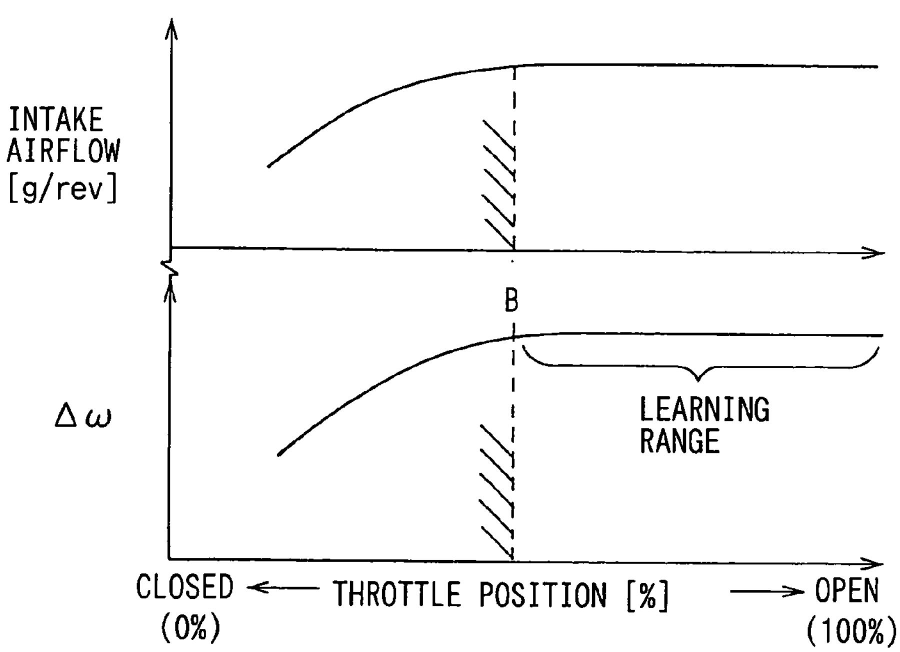
FIG. 4 is a graph illustrating a relationship between a diesel throttle position and intake airflow and a relationship between a diesel throttle position and an engine characteristic.

When the opening of the diesel throttle 6 is relatively small or nearly closed during the injection quantity learning process is implemented, a sufficient amount of air for the complete combustion of fuel injected into the combustion chamber 3 cannot be ensured. This results in a lower detected characteristic value compared to a case of complete combustion, as shown in FIG. 4. In addition, when the opening of the diesel throttle 6 is relatively small, a pumping loss increases due to an increase in the intake resistance. This too lowers the detected characteristic value. Thus, to ensure a prescribed or sufficient amount of air for the complete combustion of the fuel injected for the learning process, the ECU 11 controls the degree of opening of the diesel throttle 6 to be larger than a predetermined reference B, as shown in FIG. 4. This includes the diesel throttle 6 being fully opened. The reference B is determined to ensure the prescribed amount of air and varies depending on the engine speed.

Figure 5:
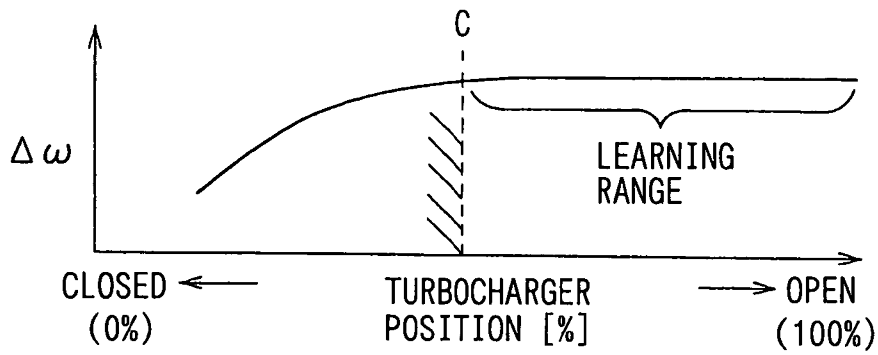
FIG. 5 is a graph illustrating a relationship between a variable turbocharger position and an engine characteristic.

When the variable turbocharger 5 is nearly closed during the injection quantity learning process, the pumping loss associated with the emission of the combustion gas from the cylinder is increased and the detected characteristic value is lowered, as shown in FIG. 5. Hence, to reduce the increase in the pumping loss, the ECU 11 controls the opening of the variable turbocharger 5 to increase. Although it is ideal that the variable turbocharger 5 be fully opened, this is not essential. It suffices that the opening is larger than the predetermined reference C, as shown in FIG. 5. With the opening within this range, the influence of the pumping loss can be eliminated.

Referring back to FIG. 2.

Step 30: The ECU 11 directs the injection for the learning process (hereinafter referred to as "one-shot injection") to be performed for a particular one of a plurality of cylinders of the engine 1. See FIG. 7(*a*), which will be discussed in more detail below. The quantity of fuel injected by this one-shot injection operation corresponds to a pilot injection quantity.

Step 40: The ECU 11 detects the amount of change of the state of the engine 1 caused by the one-shot injection operation. This is the characteristic value correlating to the injection quantity, e.g., variation in engine speed. The method of detecting the characteristic value will be described in more detail later.

Step 50: The ECU 11 determines whether or not the processing through to the detection of the characteristic value has been performed under the intended condition (i.e., the condition described with respect to Step 10). That is, at Step 50 the ECU 11 determines whether or not the learning condition indicated in Step 10 has been maintained during the detection of the characteristic value without a resumption of the injection and a change in the rail pressure. When an affirmative determination (YES) is obtained in Step 50, the ECU 11 proceeds to Step 60. On the other hand, when a negative determination (NO) is obtained in Step 50, the ECU 11 proceeds to Step 70.

Step 60: The ECU 11 stores the characteristic detected in Step 40 in a memory.

Step 70: The ECU 11 discards the characteristic value detected in Step 40.

Step 80: Based on the characteristic value stored in Step 60, the ECU 11 calculates an amount of correction, which will be discussed in more detail below.

Step 90: The ECU 11 corrects the command quantity based on the amount of correction calculated in Step 80.

The ECU 11 may perform the calculation for the amount of correction in Step 80 in one of the following ways:

1) First, the ECU 11 calculates a nominal characteristic value (e.g., a nominal variation in engine speed) based on the command quantity of the one-shot injection operation. The ECU 11 then corrects the command quantity based on a difference between the nominal value and the actual detected value of the characteristic.
2) First, the ECU 11 calculates the quantity of fuel injected during the one-shot injection operation (i.e., the actual injection quantity) based on the actual detected characteristic value. The ECU 11 then corrects the command quantity based on a difference between the actual and the command quantities.
3) First, the ECU 11 compares a first injection pulse width corresponding to the actual value of injection quantity with a second injection pulse width corresponding to the command quantity. The ECU 11 then corrects the command quantity based on a difference between the first and second injection pulse widths.

Figure 6:
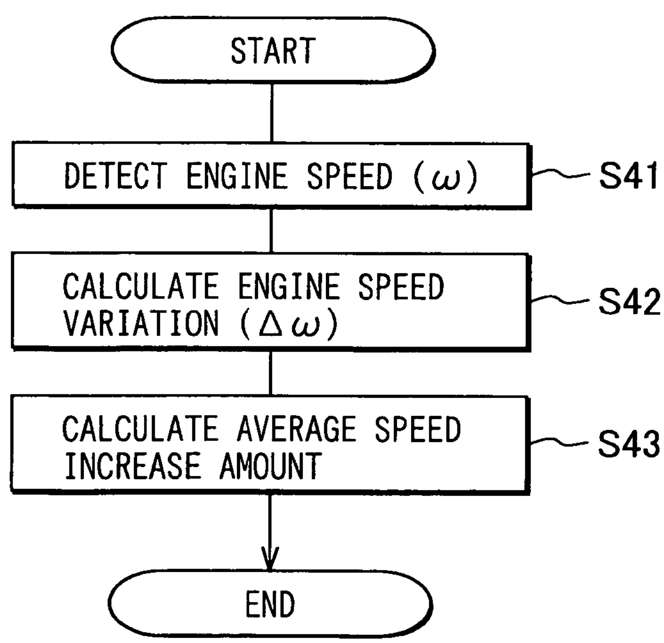
FIG. 6 is a flowchart of a process for detecting a value of the engine characteristics of FIGS. 3–5.

With reference to FIG. 6, the method of detecting the characteristic value in Step 40 is described.

Step 41: The ECU 11 receives an output signal from an rpm sensor 16 and detects an engine speed ω. In the engine 1 having four cylinders, the engine speed ω is detected four times, namely, once for each cylinder during two revolutions of a crankshaft (i.e. 720° CA). The ECU 11 stores the data in time series, ω1(i), ω2(i), ω3(i), ω4(i), ω1(i+1), ω2(i+1) . . . , wherein the numbers 1–4 following the detected engine speed ω represent the cylinder numbers. See FIG. 7(*b*).

Figure 8:
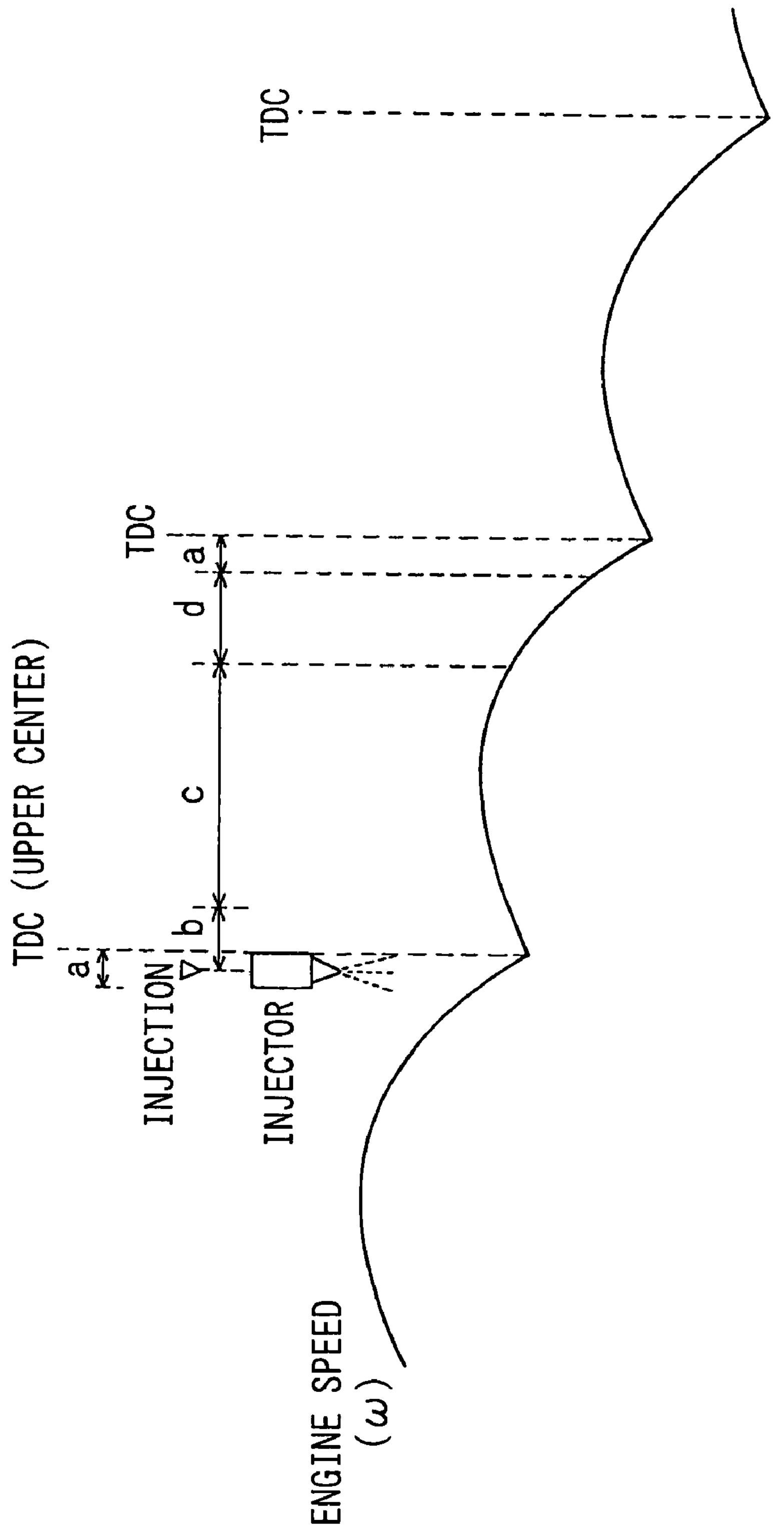
FIG. 8 is an explanatory diagram of a detection timing process of the engine characteristics of FIGS. 3–5.

The ECU 11 detects the engine speed ω immediately before injecting the fuel from the injector 2, i.e., a time period as shown in FIG. 8. An ignition delay period, identified by reference character b in FIG. 8, occurs between the moment of the end of the injection timing and the moment at which the fuel is ignited. Additionally, this is followed by a combustion period, identified by reference character c in FIG. 8, during which the actual combustion occurs. The combustion period c is followed by an engine speed detection period, identified by reference character d in FIG. 8, during which the ECU 11 detects the engine speed ω. Accordingly, the ECU 11 detects a highly accurate variation in engine speed due to the one-shot injection operation.

Figure 7:
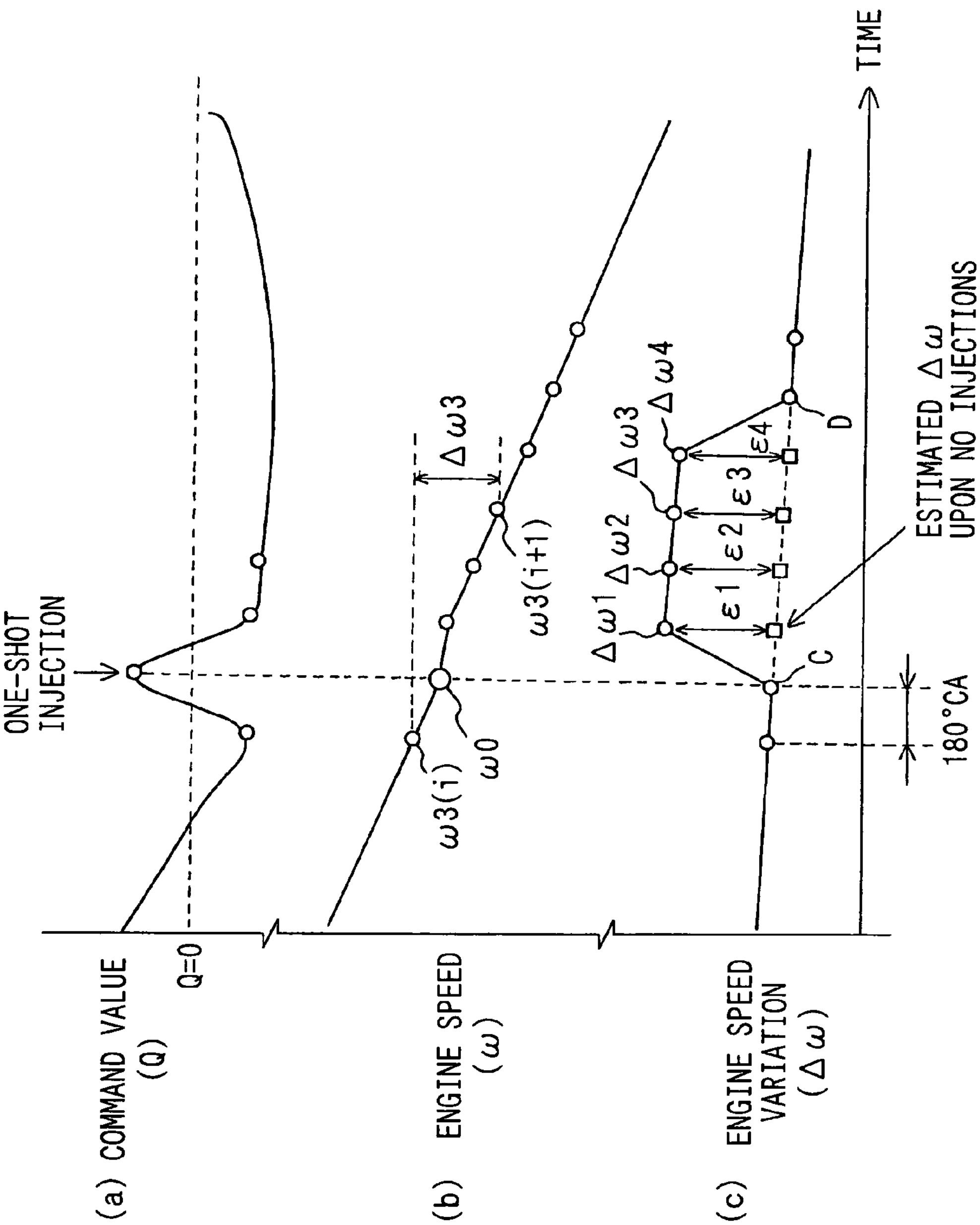
FIG. 7 is an explanatory diagram of the injection quantity learning process of FIG. 2.

Step 42: The ECU 11 calculates an engine speed variation Δω for each cylinder. For instance, for a third cylinder, an engine speed variation Δω3 defined as the difference between engine speed ω3(i) and engine speed ω3(i+1), as shown in FIG. 7(*c*). The engine speed variation Δω monotonously decreases when no injections are performed, as is shown in FIG. 7(*c*). On the other hand, immediately after a one-shot injection operation is performed, the engine speed variation Δω increases once for each cylinder. FIG. 7 shows a case where the one-shot injection operation is performed for a fourth cylinder.

Step 43: The ECU 11 calculates an amount ε of speed increase due to the one-shot injection operation for each of the four cylinders. The ECU 11 then determines an average εx of the four calculated values, which is defined as the characteristic value. The speed increase amount ε is defined as the difference between an engine speed variation Δω, which would be obtained if the one-shot injection operation had not been performed (that is, an estimation value of engine speed variation) and the engine speed variation Δω obtained in Step 42. The engine speed variation Δω, which would be obtained if the one-shot injection operation had not been performed, can be easily estimated. One way to estimate it is based on the engine speed variation Δω before the one-shot injection operation was performed. Another estimation is based on the engine speed variations Δω before and after the increase of the engine speed. These simple estimations are made possible because, as described above, the engine speed variation Δω monotonously decreases when no injections are performed.

Figure 9:
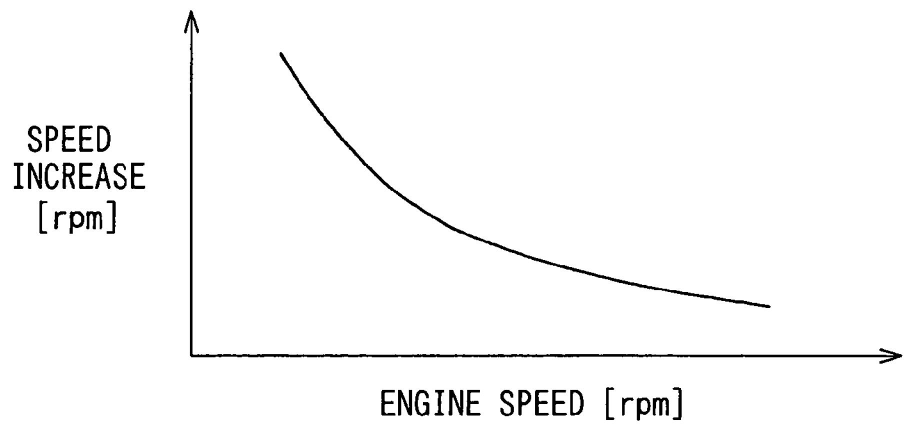
FIG. 9 is a graph illustrating a relationship between an engine speed increase and an engine speed during the injection quantity learning process of FIG. 2.

In calculating the amount of correction in Step 80, the ECU 11 estimates the actual injection quantity. This actual injection quantity is based on a torque value generated by the engine. The ECU 11 first calculates a quantity Tp proportional to the torque generated by the engine 1 by multiplying the average value εx of the four speed increase amounts ε calculated in Step 43 by the engine speed ω0 at the time of the one-shot injection operation. Then, the ECU 11 calculates the generated torque is calculated based on the torque proportional quantity Tp. Finally, the ECU 11 estimates the actual injection quantity from this calculated generated torque. Alternatively, the ECU 11 may estimate the actual injection quantity from a predetermined relationship between the average value εx of the four speed increase amounts ε and the engine speed ω0 at the time of the one-shot injection operation. FIG. 9 is a graph illustrating this for each injection quantity. Therefore, the estimation may be obtained from the graph.

Effects of the Embodiment

Accordingly, the present embodiment creates a suitable learning environment by controlling the opening of the EGR valve 9, diesel throttle 6, and variable turbocharger 5 before performing the injection quantity learning process.

More specifically, the ECU 11 controls the opening of the EGR valve 9 to be smaller than the predetermined reference A, as shown in FIG. 3. For example, the EGR valve 9 is positioned within a specific range to eliminate the influence of the inert gas contained in the EGR gas. Furthermore, the ECU 11 controls the opening of the diesel throttle 6 to be larger than the predetermined reference B, as shown in FIG. 4. For example, the diesel throttle 6 is positioned within a specific range to ensure a sufficient amount of air for the complete combustion of the fuel injected by the one-shot injection operation. Further yet, the ECU 11 controls the opening of the variable turbocharger 5 to be larger than the predetermined reference C, as shown in FIG. 5. For example, the variable turbocharger 5 is positioned within a specific range to eliminate the influence of the pumping loss.

By this arrangement, the amount of air introduced into the combustion chamber 3 of the cylinder and the composition of the air can be stabilized by eliminating the factors affecting the characteristic value. As a result, the one-shot injection operation can be implemented under a stable learning condition (i.e., within the learning ranges shown in FIGS. 3–5) a one-to-one relationship between the detected characteristic value and the actual injection quantity. Thus, a highly accurate injection quantity learning process can be performed.

Modification of the Embodiment

According to the above-described embodiment, the engine speed variation is detected as the characteristic value. However, other quantities such as the air-fuel ratio or cylinder pressure may be detected as the characteristic value.

Figure 10:
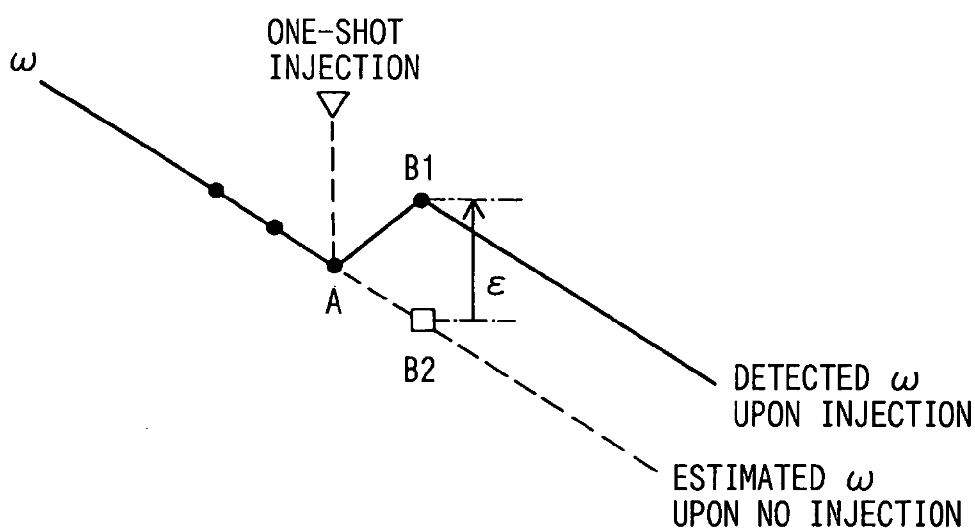
FIG. 10 is an explanatory diagram of an engine speed acquisition process of the injection quantity learning process of FIG. 2.

Furthermore, as stated above, the speed increase amount ε may be calculated one of two ways. First, the engine speed variation Δω obtained when no one-shot injection is performed and the engine speed variation Δω calculated in Step 42 resulting from the one-shot injection operation. Second, the speed increase amount ε may be calculated in step 43 as the difference between the estimated engine speed variation Δω and the engine speed variation Δω calculated in Step 42 resulting from the one-shot injection operation. Furthermore, a third determination of speed increase amount ε may be calculated as follows:

The speed increase amount ε may be calculated as a difference between an increased engine speed ω due to the one-shot injection operation and a reduced engine speed ω due to the lack of the one-shot injection operation. For example, the increased engine speed ω is obtained by the one-shot injection at a time A shown in FIG. 10. The value is detected by the rpm sensor 16 at time B1 in FIG. 10. The reduced engine speed ω is obtained at a time B2 when no one-shot injection operation is performed. B2 corresponds to time B1. Therefore, the increase from the point B2 to the point B1, shown in FIG. 10, may be calculated as the speed increase amount ε.

The reduced engine speed ω obtained when no one-shot injection operation is performed is easily estimated. It may be based on the engine speed ω before the one-shot injection operation or on the engine speed variations Δω before and after the increase in the engine speed. Specifically, the variation Δω before point C and the variation Δω after point D in FIG. 7.

Although the injection quantity learning process of the present invention has been described as being applicable to a pilot injection operation, the principle of the invention is also applicable to an injection quantity learning process for other injection operations. For example, the injection quantity learning process may be applied to a regular injection operation (in which an injection is performed once during one combustion stroke of a cylinder) without a pilot injection, a main injection operation that occurs subsequent to the pilot injection, or an after-injection operation that occurs subsequent to a main injection operation.

Furthermore, although the above-described embodiment defines the engine 1 as having an EGR system (or the EGR valve 9), a diesel throttle 6, and a variable turbocharger 5, it should be appreciated that the present invention may also be applied to a diesel engine having only one or two of the EGR system, the diesel throttle 6, and the variable turbocharger 5.

Therefore, in the case where the diesel engine only has the EGR system, only the opening of the EGR valve 9 must be controlled to be smaller than the predetermined reference in Step 20 after the learning condition is established and before the one-shot injection operation is performed.

When calculating the torque generated by the engine 1 caused by the one-shot injection operation, the amount of speed increase $\epsilon$ calculated in one of the cylinders may be used instead of the average value $\epsilon x$ of the four speed increase amounts $\epsilon$.

Furthermore, it should be appreciated that the principles of the present invention can also be applied to a fuel injection system having a distributor-type fuel injection pump having an electro-magnetic spill valve as opposed to the common rail-type fuel injection system described above.

It should be appreciated that the present invention creates a state where the stable combustion is ensured while a variation in engine load is eliminated after the predetermined learning condition is established and before the one-shot injection is performed. This ensures that the actual injection quantity corresponds to the characteristic value in a one-to-one relationship showing the influence of the one-shot injection operation. Therefore, to reduce the variation in engine load, engine accessories (e.g., an air conditioner and a charging apparatus) may be powered off and inhibited from being powered on during the learning process.

What is claimed is:

1. An injection control apparatus for an engine, comprising at least one of a valve for recirculating a portion of an exhaust gas back into an air intake passage, a diesel throttle for regulating an intake airflow, and a variable turbocharger for compressing the intake airflow by utilizing energy from the exhaust gas; and a controller for determining whether a predetermined learning condition is established, injecting a command quantity of fuel into a combustion chamber of a particular one of a plurality of cylinders of the engine when the predetermined learning condition is established, correcting the command quantity based on an amount of change of a state of the engine caused by the injecting of the command quantity, and adjusting a degree of opening of at least one of the valve to be smaller than a first predetermined reference, the diesel throttle to be larger than a second predetermined reference, and the variable turbocharger to be larger than a third predetermined reference subsequent to determining whether the predetermined learning condition is established and prior to injecting the command quantity.

2. The apparatus according to claim 1, wherein injecting the command quantity is performed after the valve is fully closed.

3. The apparatus according to claim 1, wherein injecting the command quantity is performed after the diesel throttle is fully opened.

4. The apparatus according to claim 1, wherein injecting the command quantity is performed after the variable turbocharger is fully opened to lower the boost pressure.

5. The apparatus according to claim 1, wherein the controller corrects the command quantity according to a difference between a detected amount of change of the state of the engine caused by injecting the command quantity and a calculated nominal value of the amount of change of the state corresponding to the command quantity during the injecting.

6. The apparatus according to claim 1, wherein the controller corrects the command quantity according to a difference between an actual quantity of fuel and the command quantity, wherein the actual quantity is calculated based on an amount of change of the state caused by the injecting.

7. The apparatus according to claim 1, wherein the controller corrects the command quantity according to a difference between a first injection pulse width corresponding to the quantity of fuel actually injected during the injecting and a second injection pulse width corresponding to the command quantity.

8. The apparatus according to claim 1, wherein the predetermined learning condition is a non-injecting state where the command quantity is not larger than zero.

9. The apparatus according to claim 1, wherein the amount of change of the state of the engine caused by the injecting is one of a variation in engine speed, an air-fuel ratio, and a pressure in the cylinder.

10. A method of controlling an injector of an engine, comprising:

determining whether a predetermined learning condition is established;

injecting a command quantity of fuel into a combustion chamber of a particular one of a plurality of cylinders of the engine when the predetermined learning condition is established;

correcting the command quantity based on an amount of change of a state of the engine caused by the injecting of the command quantity; and adjusting a degree of opening of at least one of a valve to be smaller than a first predetermined reference, a diesel throttle to be larger than a second predetermined reference, and a variable turbocharger to be larger than a third predetermined reference subsequent determining whether the predetermined learning condition is established and prior to injecting the command quantity.

11. The method according to claim 10, wherein injecting the command quantity is performed after the valve is fully closed.

12. The method according to claim 10, wherein injecting the command quantity is performed after the diesel throttle is fully opened.

13. The method according to claim 10, wherein injecting the command quantity is performed after the variable turbocharger is fully opened to lower the boost pressure.

14. The method according to claim 10, further comprising calculating a correction amount prior to correcting the command quantity including calculating a difference between a detected amount of change of the state of the engine caused by injecting the command quantity and a calculated nominal value of the amount of change of the state corresponding to the command quantity during the injecting.

15. The method according to claim 10, further comprising calculating a correction amount prior to correcting the command quantity including calculating a difference between an actual quantity of fuel based on an amount of change of a state caused by the injecting and the command quantity.

16. The method according to claim 10, further comprising calculating a correction amount prior to correcting the command quantity including calculating a difference between a first injection pulse width corresponding to a quantity of fuel actually injected during the injecting and a second injection pulse width corresponding to the command quantity.

17. The method according to claim 10, wherein the predetermined learning condition includes a non-injecting state where the command quantity is not larger than zero.

18. The method according to claim 10, wherein the amount of change of the state of the engine caused by the injecting is one of a variation in engine speed, an air-fuel ratio, and a pressure in the cylinder.

* * * * *